(12) United States Patent
Syeda-Mahmood et al.

(10) Patent No.: US 7,633,493 B2
(45) Date of Patent: Dec. 15, 2009

(54) CAMERA-EQUIPPED WRITING TABLET APPARATUS FOR DIGITIZING FORM ENTRIES

(75) Inventors: Tanveer F. Syeda-Mahmood, Cupertino, CA (US); Thomas G. Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 11/424,932

(22) Filed: Jun. 19, 2006

(65) Prior Publication Data

US 2007/0291017 A1   Dec. 20, 2007

(51) Int. Cl.
*G06F 3/033*   (2006.01)
*G06F 3/02*   (2006.01)
*G06F 5/00*   (2006.01)
*G06G 7/48*   (2006.01)

(52) U.S. Cl. .................... 345/179; 345/169; 703/6
(58) Field of Classification Search ............... 345/179, 345/169
See application file for complete search history.

(56) References Cited

U.S. PATENT DOCUMENTS

| | | | |
|---|---|---|---|
| 5,515,455 A | 5/1996 | Govindaraju et al. | |
| 5,546,538 A | 8/1996 | Cobbley et al. | |
| 6,011,865 A | 1/2000 | Fujisaki et al. | |
| 6,044,165 A | 3/2000 | Perona et al. | |
| 6,108,444 A * | 8/2000 | Syeda-Mahmood | 382/186 |
| 6,178,417 B1 * | 1/2001 | Syeda-Mahmood | 707/3 |
| 6,188,392 B1 | 2/2001 | O'Connor et al. | |
| 6,491,220 B1 | 12/2002 | May | |
| 6,567,078 B2 | 5/2003 | Ogawa | |
| 6,592,039 B1 | 7/2003 | Smith et al. | |
| 6,633,671 B2 | 10/2003 | Munich et al. | |
| 6,650,320 B1 | 11/2003 | Zimmerman | |
| 6,659,611 B2 | 12/2003 | Amir et al. | |
| 6,686,579 B2 | 2/2004 | Fagin et al. | |
| 6,703,570 B1 | 3/2004 | Russell et al. | |
| 6,885,759 B2 | 4/2005 | Cox et al. | |
| 6,947,029 B2 | 9/2005 | Katagiri et al. | |
| 2002/0193975 A1 * | 12/2002 | Zimmerman | 703/6 |
| 2006/0007189 A1 * | 1/2006 | Gaines et al. | 345/179 |

* cited by examiner

*Primary Examiner*—Sumati Lefkowitz
*Assistant Examiner*—Charles Hicks
(74) *Attorney, Agent, or Firm*—Gibb I.P. Law Firm, LLC (57) ABSTRACT

The embodiments of the invention provide an apparatus, method, etc. for a camera-equipped writing tablet for digitizing form entries. More specifically, a data capture apparatus comprises a form holder and an image capture device connected to the form holder. The image capture device is positioned to capture an image of a form on the form holder, wherein the form could be a paper form. A clip is connected to the form holder, wherein the image capture device is mounted to the clip. The apparatus further comprises an electronic pen connected to the form holder, wherein the form holder comprises an electronic pen capture device to electronically capture marks made on the form using the electronic pen. The electronic pen is a combination ink and electronic pen that is temporarily connected to the form holder.

20 Claims, 9 Drawing Sheets

CAMERA-EQUIPPED WRITING TABLET APPARATUS FOR DIGITIZING FORM ENTRIES

BACKGROUND

1. Field of the Invention

The embodiments of the invention provide an apparatus and method for a camera-equipped writing tablet for digitizing form entries.

2. Description of the Related Art

Computerized physician order entry systems (CPOE) reduce clinical errors and streamline the order entry process in hospitals [1]. The current practice of converting hand-filled forms to electronic records is slow, taking usually 2-3 weeks for the filled form entries to be available to physicians in their clinical information systems. Such delays in transcoding as well as the human data entry errors are the leading cause of clinical errors. Automatic data entry using off-line form recognition is usually not an option in such cases due to the handwritten entries on the forms. In spite of this, fewer that 6% of the hospitals in the United States have adopted complete CPOE systems. The two main reasons for their lack of adoption are the cost and physicians' acceptance of the devices, as now they are responsible for the data entry themselves through order entry devices. CPOE systems for large hospitals are a fairly expensive (>$1 Million) proposition, requiring investment in order entry devices such as tablet PCs or wireless PDAs and their associated backend servers and medical data warehouses. While cost is a consideration, the lack of physician's adoption of such devices is a problem of greater concern as it appears to be due to lack of suitable devices that provide the expected ease-of-use. While PDAs are cost effective, their small form factor (approximately A8 size page) makes entering data difficult. Presenting all the information needed in an aesthetically viewable format is also difficult, in general, due to the size of the associated displays. Forms are often displayed in portions only leaving an incomplete overall picture of the choices made by the physicians. Images, in particular, cannot be displayed at a resolution needed for diagnostic decision making. Augmenting PDAs with better projection displays would increase the cost and make them less ubiquitous. In contrast, the Tablet PCs has sufficient display size for a good viewing experience. However, they are expensive, and being full-scale computers, are an 'overkill' for order entry purposes. Further, they are heavy (~1.5 kg) and fragile (e.g. glass display, disk drive), may need frequent recharging, and are usually targets of theft.

Thus, price and ease-of-use are two major barriers to the adoption of CPOE systems in hospitals. In surveys of physicians, a popular question is, "How can physicians be best encouraged to use CPOE systems?" The surprising answer is that for most order-entry purposes, they actually prefer the ease-of-use offered by paper forms. It is still easier and faster to tick off boxes on a form, scrawl an order in a chart, than to log on to a computer system, call up the appropriate screen, examine the information presented, and click or type a response. Traditional paper forms create a lower cognitive load, allowing the medical practitioner to focus their attention on the patient, rather than the tool. It is also simple, inexpensive, light-weight and easy to maintain.

Thus, to reduce clinical errors as well as increase physicians' acceptance, it appears that an order-entry device is needed that preserves the familiar experience of filling out a paper form while allowing automatic conversion of filled content into electronic records. Automatic form and field identification are challenging problems. Ease of use considerations prefer that the camera be placed in unobtrusive locations leading to significant perspective distortion in the captured images. This makes reliable identification of forms difficult. Also, since the camera is very close to the imaged object (form), weak perspective projection models do not hold, requiring the use of projective transforms. Since pose registration errors can lead to the wrong field labels being assigned to the tablet, careful analysis of the projection geometry of the camera, the tablet, and the original form is performed.

Camera-assisted form tablets have not been introduced in research literature or commercially on the market. The technology exploited herein is based on prior work on object indexing and form recognition. In particular, recognition of scanned forms has been addressed by a number of researchers [6, 7, 11, 12, 13-17]. Several low-level form processing and feature extraction methods [11, 12] exist including those that analyze layout [7, 18], fields [15], and hand-filled entries [12, 13]. Registration methods based on projective geometry have been used for scanned form alignment and recognition [16]. While almost all form recognition work assumes printed forms, a document imaging camera system by XEROX (Stamford, Conn., U.S.A.) is available. The focus in this system has been on image processing of the document to filter, de-skew and produce better document appearance rather than form identification and automatic field extraction. The predominant techniques for identifying the form type use bar codes or OMR technology. The recognition of printed text on forms is done fairly well using commercial OCR engines and most OCR software also offer their engine bundled in form recognition software. The recognition of handwritten text, however, is still an open problem for scanned forms. Thus the problem of identification of forms from camera-grabbed images as well as the indexing of such form databases has not been addressed.

The work on form indexing herein is based on the technique of geometric hashing previously introduced for the model indexing problem in computer vision [2]. Several variants of this technique have appeared in literature including line hashing [3] where the basis space was formed from lines, location hashing [4] and region hashing. The sensitivity analysis of geometric hashing was done in [5] where the limitations of the technique were described. While hashing has been attempted with line basis or point basis, the combination of point basis space and line affine-invariants has not been explored.

SUMMARY

The embodiments of the invention address the problems of form and field identification needed for accurate order entry. Specifically, the form identification is modeled as the problem of shape content-based retrieval from a form database using the perspectively distorted form appearance images as queries. A fast form indexing method is presented that is an adaptation of geometric hashing [2]. In particular, basis space is carefully selected for reducing the time and storage complexity of hashing. Further, affine-invariant features based on lines in addition to points are provided to increase the precision of geometric hashing. Next, the field identification problem is addressed by deriving a sequence of projective transformations between the tablet, the camera and the original electronic form to allow accurate field registration. Once the field label is identified, online OCR of tablet writing can be performed to allow data storage in text form. Alternatively, the tablet writing signals can be stored directly in the electronic record in vector format for later display through suitable viewers during manual examination of the electronic medical record (EMR). For most EMR uses, such as prescription filling, such visual examination of high resolution tablet writing data is sufficient and can significantly reduce order entry errors.

Embodiments herein provide an order-entry device that uses cameras images integrated with tablet writing. Further, the problems of recognition, indexing, and field identification for camera-grabbed forms are addressed. As described above, previous work on forms has primarily focused on scanned or electronic forms. The technique of form hashing presented herein is applicable for other use besides physicians' order entry devices, wherever paper form to electronic form conversion is needed, thus enabling digital notepads of the future.

The embodiments of the invention provide an apparatus, method, etc. for a camera-equipped writing tablet for digitizing form entries. More specifically, a data capture apparatus comprises a form holder and an image capture device connected to the form holder. The image capture device is positioned to capture an image of a form on the form holder, wherein the form could be a paper form. A clip is connected to the form holder, wherein the image capture device can be mounted to the clip. It is recognized that the image capture device could also be positioned over the form holder, proximate a bottom portion of the form holder, or proximate side portions of the form holder. Multiple cameras may also be used to provide a plurality of views of the form.

The apparatus further comprises an electronic pen associated with the form holder, wherein the electronic pen can be, but need not be tethered to the data capture apparatus. The form holder comprises an electronic pen capture device to electronically capture marks made on the form using the electronic pen. The electronic pen is a combination ink and electronic pen that is associated with the form holder.

A processor is also provided to query a form database using the image of the form to identify the form. Additionally, the processor correlates the marks made on the form with respective data fields on the form and stores the marks in the respective data fields. Moreover, the processor matches affine-invariant features of the form with affine-invariant features of model forms in the form database, wherein the affine-invariant features include point features, line features, and/or intersection of lines features.

In addition, a method is provided wherein an image of a printed form is obtained using at least one camera attached to a form holder. Image capture is automatically initiated when a user start command is received. This could be silent when a paper is inserted by means of a pressure sensor to detect the pressure of the clip on the clipboard, motion sensing device in the clipboard or when a user taps into a designated area of the clipboard. An image of only a portion of the printed form may be obtained. If multiple cameras are used, several images of the form taken from different perspectives may be obtained.

Next, the method identifies the printed form, wherein the image of the printed form is utilized to query a form database. This involves model creation, wherein images of original forms are obtained and shape-based features within the images are identified. The shape-based features are subsequently stored in the form database to create model forms. Moreover, the querying of the form database includes matching affine-invariant features of the printed form with affine-invariant features of the model forms in the form database. The affine-invariant features include point features, line features, and/or intersection of lines features.

Following this, the method obtains handwritten input on the printed form using the form holder, wherein the form holder has an electronic pen capture graphic user interface. The handwritten input is correlated with respective data fields on the printed form and stored in the respective data fields.

Accordingly, embodiments herein provide a camera-augmented writing tablet that allows physicians to write orders on paper forms placed on a tablet pad. The form filling actions are recorded as online handwriting signals by the tablet. To covert such writings into electronic form entries, the device determines the identity of the form being filled. Ease of use considerations prefer that this process be automatic in order to relieve physicians from the burden of remembering to scan artifacts such as bar codes prior to making form entries. The device subsequently identifies the field labels against which entries are being written. This will enable the population of the correct field entries in the corresponding electronic medical record.

A microphone may be added to the clipboard to allow the clinician or patient to record spoken entries. A camera, which can be still, movie, or both, may be included in the clipboard that can be used to photograph the patient, creating a visual record of patient conditions and progress. The audio and photographic entries can be stored along with handwritten entries, creating a multimedia record of a patient interview.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 3(a) illustrates an original medical form;

FIG. 3(b) illustrates a filled medical form;

DETAILED DESCRIPTION OF PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

Embodiments herein provide a camera-augmented writing tablet that allows physicians to write orders on paper forms placed on a tablet pad. The form filling actions are recorded as online handwriting signals by the tablet. To covert such writings into electronic form entries, the device determines the identity of the form being filled. Ease of use considerations prefer that this process be automatic in order to relieve physicians from the burden of remembering to scan artifacts such as bar codes prior to making form entries. The device subsequently identifies the field labels against which entries are being written. This will enable the population of the correct field entries in the corresponding electronic medical record.

Computerized physician order entry systems reduce clinical errors and streamline the order entry process. Current order entry devices either lack the ease of use of paper forms (PDAs) or are not cost-effective (Tablet PC). A camera-assisted writing tablet is provided as an order entry device that preserves the familiar experience of filling out a paper form while allowing electronic conversion of relevant field entries without explicit form scanning. Embodiments herein address the problems of form indexing and field identification that are preferred for accurate association of tablet writing with corresponding entries in the electronic form. Form indexing is modeled as the problem of shape-based content retrieval using the perspectively distorted form appearances seen from the tablet camera. A fast form indexing method is presented that is an adaptation of geometric hashing based on a careful selection of basis space and affine-invariant features derived from lines and points. A sequence of projective transformations are also derived between the tablet, the camera and the original electronic form to allow field identification through a registration of tablet handwriting with the corresponding field labels on the form.

The following introduces the camera-assisted physician's order entry device and describes the form processing workflow. This will help illustrate the need for form and field identification.

Figure 1:
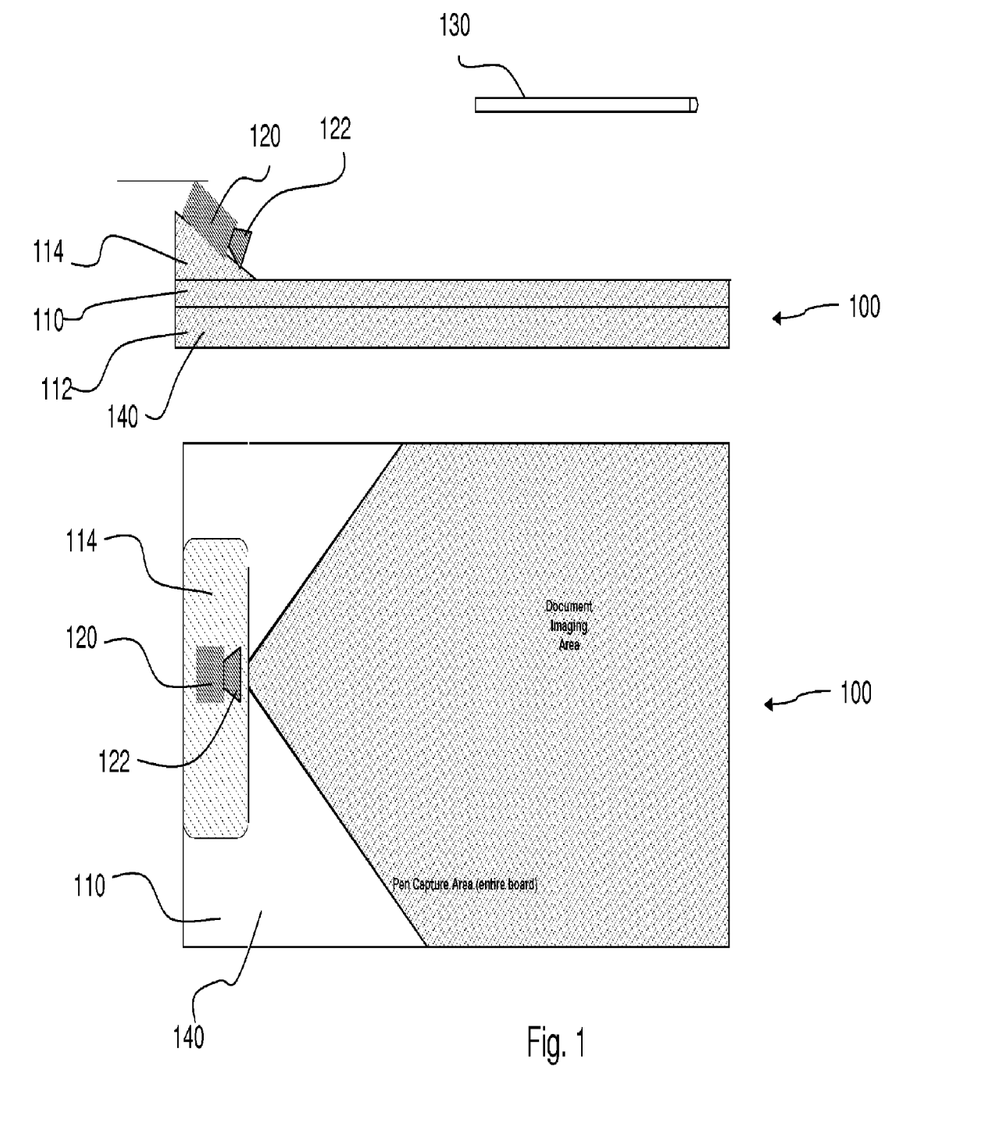
FIG. 1 illustrates a camera-equipped writing tablet.

The design of the device 100 is illustrated in FIG. 1. The device 100 includes a clipboard 110 (also referred to herein as the "form holder") with a pen digitizing tablet 112 (also referred to herein as the "electronic pen capture device") [9] underneath and a VGA digital camera 120 (also referred to herein as the "image capture device") [10] with fish-eye lens 122 (64×86 degrees) attached to the metal clip 114 of the clipboard 110. The clipboard 110 could be 300 mm long, wherein the clipboard 110 and the digitizer tablet 112 could have a combined height of 21 mm. A wireless inking pen 130 (also referred to herein as the "electronic pen") allows the physician to enter notes directly on the form, while the digitizer 112 captures pen coordinates and pen tip pressure.

The digitizer tablet 112 provides high spatial (1000 points per inch) and temporal (200 Hz report rate) resolution for online capture of pen input (handwriting). The camera 120 is mounted near the top of the clipboard 110 both for capturing as much of the form as possible, and to avoid obstruction during writing, keeping in mind the ease of use. The camera 120 can be oriented on the clip 114 to place 480 pixels across the width of the form and 640 pixels down the length of the form. The top of the camera 120 could be 34 mm from the top of the clipboard 110, wherein an angle between the top of the camera 120 and the top of the clipboard 110 could be 30 degrees.

The tablet signal and the camera images are transmitted to a central processor 140 for form processing. Wireless transmission of the data is also possible. Thus, the processor 140 could be onboard or remote at a server in which case the wireless device on FormPad relays all the data to the server for processing. To sense that a new form has been inserted into the device 100, a force sensing resistor (FSR) is attached to the clip 114. An image of the form is captured each time pressure is released from the clip 114. Blank images, indicating a form has been removed are ignored. Several images can be collected after the clip 114 is released; in case a hand is obscuring part of the form image.

The use of camera-equipped clipboards as form entry devices offer many advantages over offline form handling as well as PDAs and Tablet PCs. First, the manual handling workflow of the offline form processing can be avoided. With online handwriting signals extracted from pen digitizer tablets, the spatial and temporal resolution is fairly high (1000 dpi @ 100 Hz) and is expected to do much better at handwriting OCR than off-line OCR on scanned forms.

Since physicians don't have to make any adjustments with camera-equipped clipboards (they don't even have to scan a barcode), this is expected to offer them ease-of-use. Finally, A4 form-size pen digitizer tablets costs about $200 making the cost of camera-equipped pen digitizer tablet similar to PDAs. Thus, while PDAs are more suitable for small forms (e.g. prescription filling), and dynamically adapting forms (multi-option forms based on choices made), the camera-equipped pen digitizer tablets are a suitable low-cost alternative for most standard forms offering better text extraction and integration with order entry systems than current offline form recognition systems.

While both scanned forms and camera-grabbed forms result in images, there is a considerable difference in their form processing workflow. First, the effects of perspective distortion are dominant and must be taken into account. Secondly, since the resolution is limited so that OCR on camera-grabbed forms is expected to be poor, online OCR is substituted using the writing signal from the tablet. With the tablet though, determining field labels and entries against fields becomes a problem since it cannot 'see' what is being written. The camera enables form identification and field recognition in this case, but the ultimate registration still needs to be performed with the tablet data.

Figure 2:
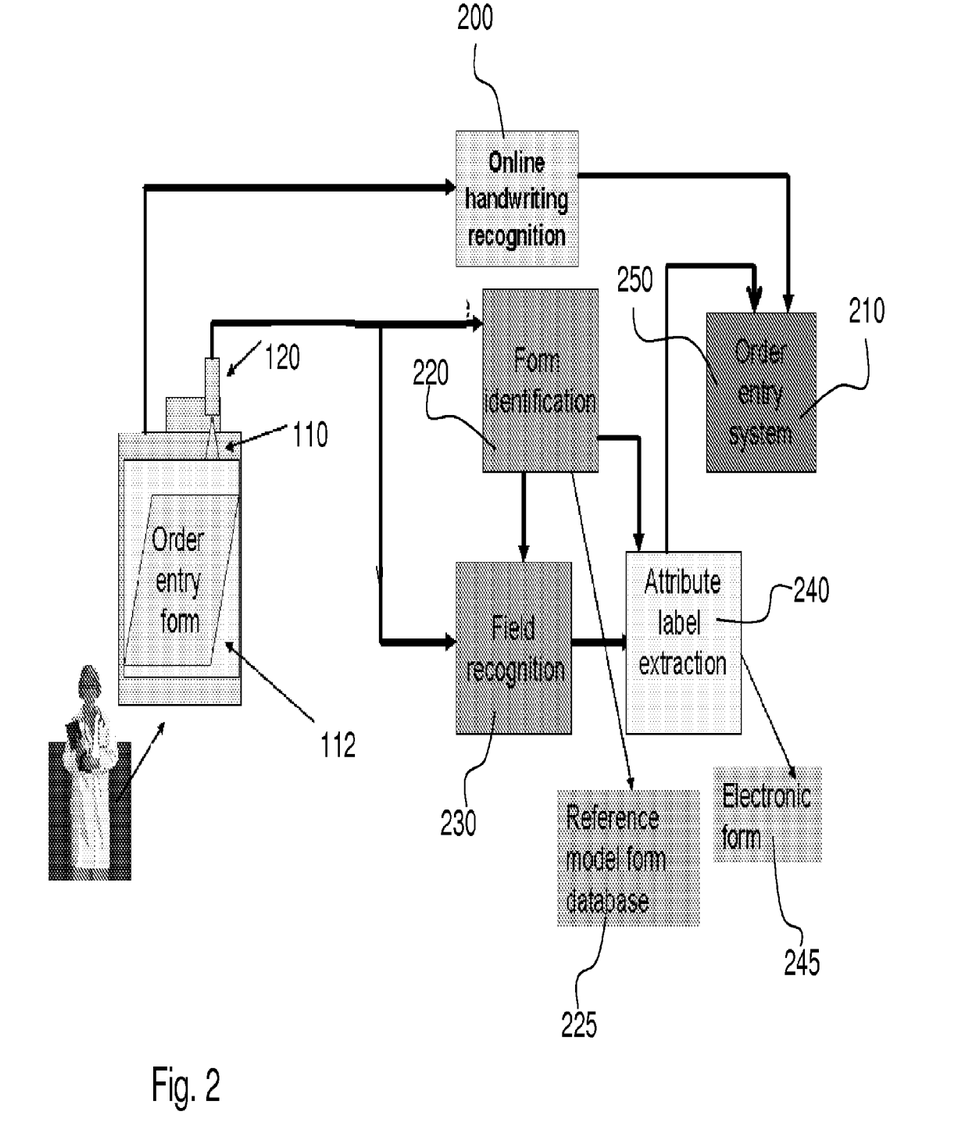
FIG. 2 is a diagram illustrating a form processing workflow.

The basic form processing workflow using the device 100 consists of an offline form model creation and calibration stage, and live form processing stage, as illustrated in FIG. 2, and described below.

In item 200, the digitizer tablet 112 recognizes tablet writing from a user. Text from the tablet writing is subsequently extracted and sent to an order entry system in item 210. Furthermore, in item 220, an image of an order entry form placed on the clipboard 110 is captured by the camera 120 and identified. This involves, in item 225, referencing model forms in a form database. In item 230, tablet writing from the user is captured and the field in which the writing is entered is recognized. Next, in item 240, attribute label extraction is performed wherein the tablet writing is analyzed to resolve the tablet text and field correspondence. This involves, in item 245, referencing the electronic form. Following this, in item 250, the extracted attribute label and projected writing is sent to the order entry system.

As with offline form recognition systems, methods of form identification and registration herein are also model-based.

Since image-based registration is used, all electronic forms are reduced to image form (e.g. PDF to TIF conversion). This model image is referred to as the original form O. FIG. 3a shows an original medical form.

Figure 4A:
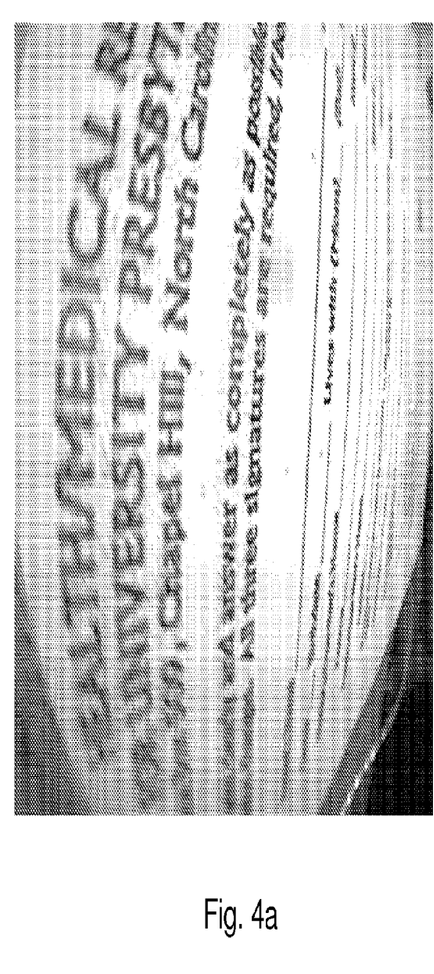
FIG. 4(a) illustrates an image of a reference model form.

For purposes of form identification and registration, a second version of the model is created, called the reference form M. For this, the electronic form is printed and placed on the clipboard within fixed reference markers. This ensures that all forms will be subject to the same reference model creation process, and allows the use of a single alignment transform from tablet to original form, as described below. FIG. 4a shows the reference form for the original form shown in FIG. 3a. As can be seen, considerable perspective distortion has been introduced in viewing through the camera.

The original and reference form images so created are stored in the original and reference form database. The reference form images are pre-processed and their features extracted and indexed to form a model database, the details of which will be described below. The reference model database is used to perform form identification (see FIG. 2).

Figure 4B:
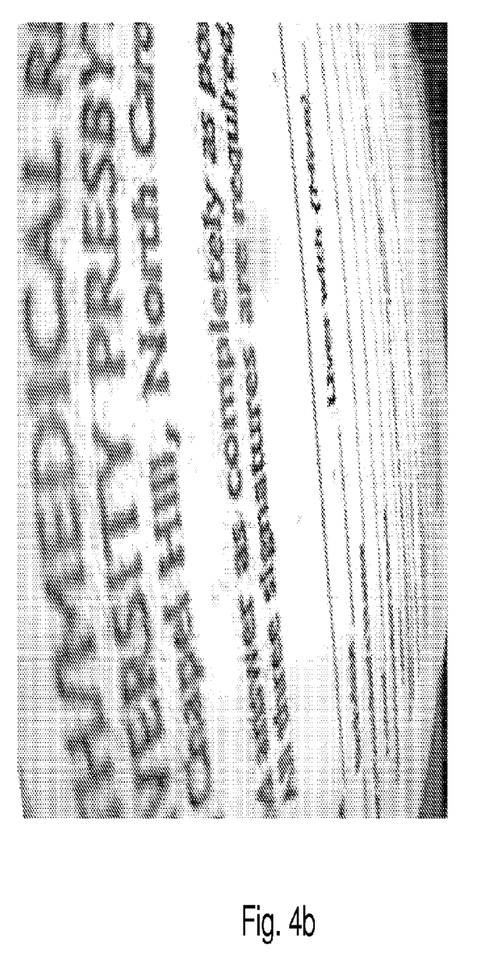
FIG. 4(b) illustrates an image of a sample form.

When a sample form is placed on the clip-board, the force sensor alerts its presence to initiate form identification. While the document was placed within registration markers during the model creation stage, no such restriction can be placed during actual use. Hence the form placed by users tends to have a fair amount of skew as shown in FIG. 4b, which depicts a sample version of the reference form shown in FIG. 4a. As can be seen, both rotation and translation are evident. Further, due to the effect of perspective projection, skew and foreshortening is evident as well. The form identification problem is to recognize the sample form as depicting a possibly different view of an original form whose corresponding reference form exists in the model database. Form identification is discussed in detail below.

Figure 5:
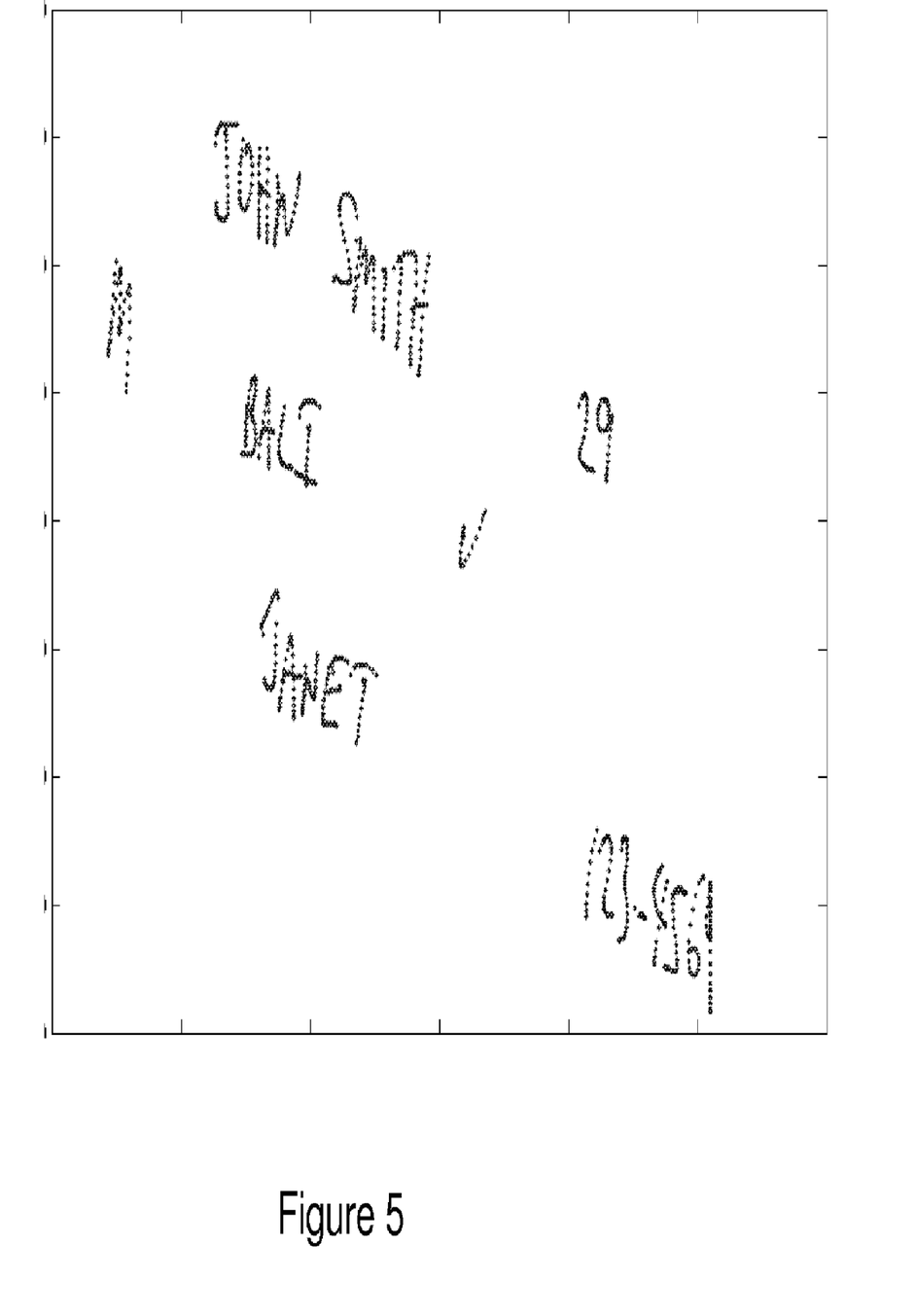
FIG. 5 illustrates tablet writing on the sample form of FIG. 4(b)

As the user begins to write on the form, the pen pressure is sensed through the tablet, and a 4-dimensional signal (x, y, p, t) is created where x and y are the tablet coordinates, p is the pen pressure, and t is the time at which the pen position was recorded by the tablet. FIG. 5 shows sample words filled on the form of FIG. 4b. Only the x, y position on the tablet is shown for purposes of illustration. The handwritten text can be discerned easily from this projection. Since the sample form was placed at an angle, there is rotation (skew), and translation in the appearance of the handwriting.

A goal of form registration and field identification is to align the tablet writing with relevant sections of the original form O. This involves de-skewing the tablet writing and projecting the words at appropriate locations on the original form to approximate their actual visual appearance as seen by the user. Thus, when the form of FIG. 4b is filled with the words shown in FIG. 5, the actual appearance of the form is as shown in FIG. 3b. A goal in form registration is to approximate this look with the tablet writing projected onto the original form, without an explicit scanning of the filled form. This would also indicate that the tablet text has been correctly assigned to its corresponding field label. As described below, this skew is a transform that can be derived after careful analysis of the projection geometry and projection relationships between the camera, the tablet and the original form.

Due to numerical inaccuracies in the computation of the projection transforms, the projected text will be close to a field label but may be not as accurately aligned as its actual physical appearance. In fact, if the field labels on the form are very close, e.g. in a tabular form, it is possible that the projected text falls close to an adjacent field label. To extract the field label, therefore, the original electronic form is searched in a small neighborhood around the projected text for candidate field labels. Text recognition of the field labels is performed and the tablet writing entries are then analyzed to resolve the tablet text and field correspondence.

Once the field label is known, its corresponding tablet text is stored against the field label in an electronic record in a back-end order entry system. Where human interpretation of the form is necessary, as for example, in prescription filling or conducting ordered lab tests, the tablet signal can be directly displayed through its (x, y) projection (see FIG. 5). The tablet data can be efficiently represented and displayed using VRML or other suitable graphics languages.

When the electronic record is to be interpreted by a machine, as for example in data mining of the electronic records to record patient statistics, online OCR becomes useful. Unlike off-line handwriting recognition in scanned forms, online OCR using high resolution tablet data is more feasible.

The problem of form identification can be stated as follows: given a sample form I seen by the camera, determine the original form O corresponding to I using the appearance form images in the database. In practice, since the number of forms in the database is large, and live form processing is desirable, it should be possible to identify the original form without exhaustively searching the form database. A method of form identification that achieves form recognition as well as form indexing is provided.

To recognize the original form O corresponding to the given sample form on the tablet, it is sufficient to determine if the associated reference form M in the model database and I are two views of O. In general, since forms are planar objects, the relation between the two views I and M can be described by an affine transform if weak perspective projection model holds. However, due to the viewing geometry in the device 100, the distance between the camera and the form is smaller than the form dimensions, so that a full perspective model must be applied. In that case, two views are related by a projective transform P. That is, given a point (x, y) in I, its corresponding point (x', y') in M is related by:

$$x' = \frac{p_{11}x + p_{12}y + p_{13}}{p_{31}x + p_{32}y + 1} \quad y' = \frac{p_{21}x + p_{22}y + p_{23}}{p_{31}x + p_{32}y + 1}$$

where the coefficients are elements of the projective transform P given by $$P = \begin{bmatrix} p_{11} & p_{12} & p_{13} \\ p_{21} & p_{22} & p_{23} \\ p_{31} & p_{32} & 1 \end{bmatrix}$$

The above 8 parameter projective transform for planar objects can be recovered from a set of 4 corresponding points through a linear system of equations. The details of these computations are given in [19].

Once the projective transform is recovered, it can be verified by projecting the rest of the sample form features into the model form, and noting the fraction of sample form features that fall near the model form features.

Because of their text and graphical content, form images tend to have a large number of features, for example, 3000 corners and 2000 lines. If each model form in the database was exhaustively searched, this would take $O(m^4 n^4 * N)$ time where m and n are the average number of features per model form and sample form respectively, and N is the number of forms in the database.

A method to do efficient form indexing that avoids such exhaustive search is described. Although recovering the projective transform was preferable for accurate form registration, the affine projection model is sufficient for purposes of filtering of non-matching forms. The use of affine instead of projective transform affects mostly the extent of alignment during verification but does not materially affect the selection of the correct form.

The indexing technique used is called form hashing, and is based on the idea of geometric hashing, previously used for model indexing in computer vision [2, 3, 4]. As in geometric hashing, an affine-invariant coordinate system is formed using three basis features (O, $P_1$, $P_2$) on the form; so that the shape layout of the remaining features P can be described using their affine coordinates ($\alpha$, $\beta$) as $$OP = \alpha OP_1 + \beta OP_2$$

FIG. 7 illustrates affine coordinates for corners. It can be shown that affine coordinates are invariant under an affine transformation [2]. In addition to point features, the use of line features are considered for indexing, since lines are fairly distinctive on forms, and capture the shape layout better. However, lines are susceptible to occlusions due to changes in imaging conditions including noise. Affine-invariant features derived from lines that are robust under occlusions are provided. Specifically, the use of intersection points of lines with the affine basis is provided.

Figure 6:
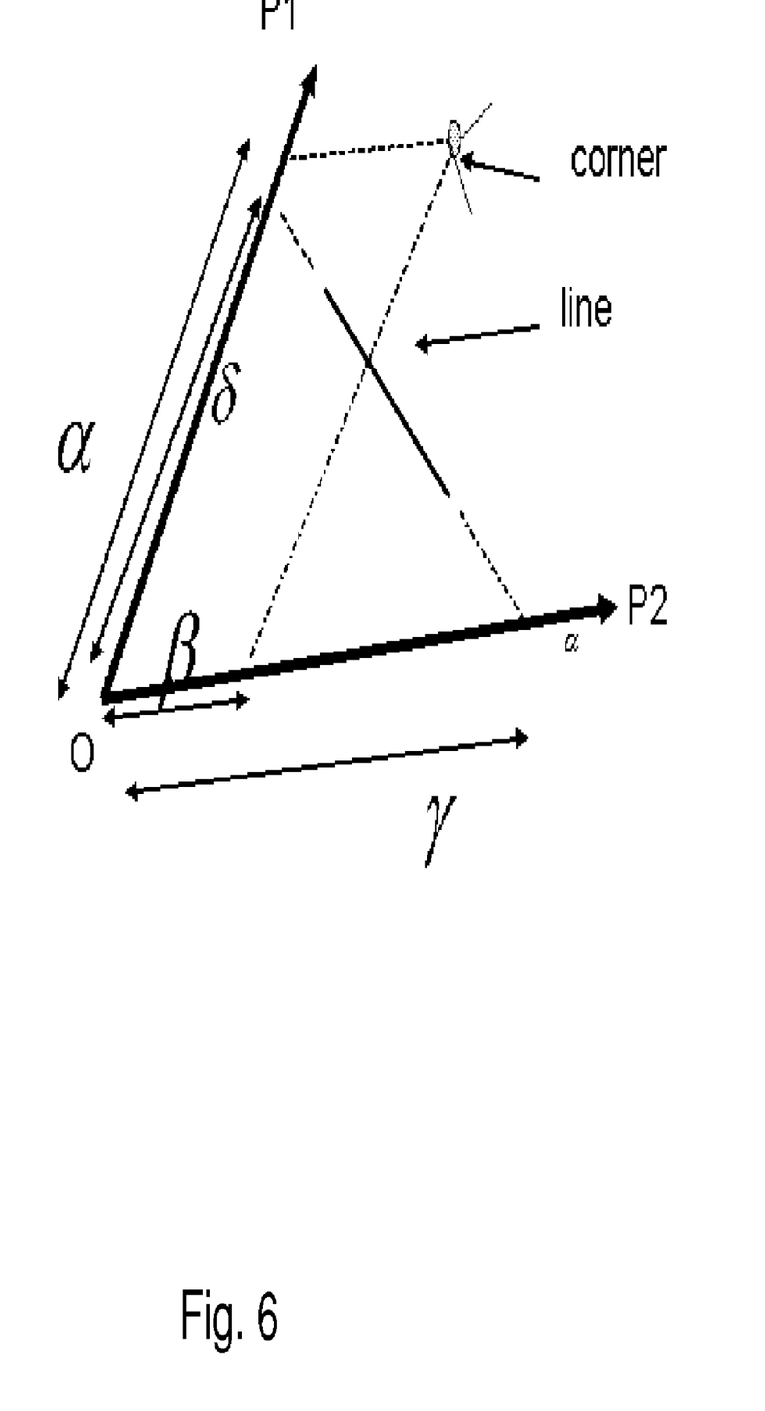
FIG. 6 illustrates point and line affine features used for form hashing.

FIG. 6 shows the line affine coordinates ($\gamma$,0), (0,$\delta$) so derived. Since the affine coordinates of all points along the line are affine-invariant, this holds for the intersections points as well. They are also fairly reliable for distinguishing between non-collinear lines, and are not affected by partial occlusions along the line. This approach is different from line hashing [3], where a line basis was chosen to describe lines. Due to the sensitivity of lines to occlusions, such line basis and coordinates derived from the basis tend to be less stable than the line affine coordinates above.

The affine-invariance of features can be exploited to distinguish the correct form in the model database from others, as it will have matching affine coordinates with respect to the chosen basis. To provide robustness to occlusions and noise, such affine-invariant features have to be generated with respect to multiple basis triples chosen from the form. Fortunately, the coordinates can be pre-computed and stored in a hash table/tree during the model creation stage [4]. For point features, all relevant basis triples that give rise to common point affine coordinates can be pooled as $$H_1(\alpha,\beta) = \{<O,P_1,P_2,B,F> \ldots \}$$

where B is the basis index representing the basis triple (O, $P_1$, $P_2$) and F is the form index. For lines, the line affine coordinates ($\gamma$,0), (0,$\delta$) can be expressed jointly as ($\gamma$,$\delta$) as $$H_2(\gamma,\delta) = \{<O,P_1,P_2,B,F> \ldots \}$$

Form hashing therefore involves two stages, namely model creation, and form indexing. In the model creation stage, points (corners) and lines are extracted from the model form image. A set of basis triples is then selected using the point features. Point and line affine coordinates are then computed with respect to the chosen basis triples. The basis triples that give rise to the coordinates are consolidated in the hash tables described above. In the form indexing stage, identical processing is applied to a sample form to extract the point and line affine coordinates with respect to a set of chosen basis triples. The resulting coordinates ($\alpha$,$\beta$) and ($\gamma$,$\delta$) are used to index $H_1$ and $H_2$ respectively. The basis triples thus indexed, are consolidated to form a basis histogram. The form indices associated with the peaks in the basis histogram reveal the candidate matching forms.

The affine transform relating the two views can be recovered from the matching basis triples [2]. The correctness of form hashing can be verified by projecting the sample form features onto the model forms using the computed affine transform. The fraction of sample form features that project close to a model feature constitute the verification measure. Such features can also be taken as additional corresponding points for robust computation of the actual projective transform of Equation 1 for form registration later.

The time and space complexity of form hashing depends on the number of basis triples used. Ideally, if all possible basis triples are chosen, the space complexity is $O(N^4M)$ where N is the number of point features and M is the number of models. In the best case, only one basis triple need be tried for form indexing leading to O(N) time for indexing. In practice though, a large number of basis triples need to be tried to obtain clear peaks in the basis histogram raising the time complexity to be $O(N^4)$ in the worst case. A method to identify basis triples that keeps the indexing complexity to be $O(N^2)$ in the worst case is provided. Specifically, basis features that are widely separated are chosen. Widely separated basis not only give numerically accurate poses but are far fewer in number. They can be chosen as follows. For each point feature O, the farthest feature P1 in O(N) time is determined. This is repeated for feature P1 to get a second feature P2 in O(N) time. The resulting triple (O, P1, P2) is discarded if distance between O and P2 is less than the distance between (O,P1) and (P1,P2) by a certain threshold. Using this process, only one basis triple is generated per point feature giving a total of O(N) triples. This reduces the storage complexity to be $O(N^2M)$ while keeping the time complexity during indexing to be $O(N^2)$. Such a choice of basis triples causes no significant loss in form indexing accuracy. In fact, since there are only O(N) basis triples, all of them can be used during form hashing to give a more accurate basis histogram and hence greater accuracy in form identification.

Once the form has been identified, the next step is to align the writing captured (digital ink) in tablet coordinates with the appropriate fields on the original form. The projection geometry relating tablet, the camera, and the placement of form on the tablet is analyzed.

The resolution differences between the tablet coordinates and the original form coordinates can be modeled by a scaling deformation. In addition, since the tablet origin may not be aligned with the original form image origin, there is usually translation as well. If the original form image has been obtained from a printing of electronic form followed by scanning, there is skew as well. Thus the relationship between tablet coordinates and original form coordinates can be modeled by an affine transform $P_{TO}$ so that a tablet coordinate $X_t = (x_t, y_t)$ projects to a location $X_o = (x_o, y_o)$ on the original form which is given by $$X_o = A_{TO} X_t + T_{TO}$$

where $A_{TO}$ models the skew and rotation while $T_{TO}$ models the translation aspects of the affine transform $P_{TO}$. For all electronic forms of the same size, say, 8½×11 inches, and using a systematic generation of the original form image (by screen grabbing for example), such a transform need only be computed once. To use this transform directly for any paper form placed on the tablet though, an alignment of the paper form and tablet coordinates is assumed. One way to ensure this is to place reference markers on the tablet between which the form can be placed. Since this can be burdensome for the users, an approach in which such a reference placement be done only once for the reference form during model creation is provided. Any skew in a sample form being used can be recovered by matching to this reference view. This once-per-form reference marker placement can be done offline by Device Administrators without involving the actual users.

In camera coordinates, the form skew can simply be estimated by the projective transform computed during the form indexing process. This transform $P_{C'C}$ relates the current skewed sample form coordinates $(x'_c, y'_c)$ to the model form coordinates $(x_c, y_c)$ by the non-linear transformation given by:

$$x' = \frac{p_{11}x + p_{12}y + p_{13}}{p_{31}x + p_{32}y + 1} \quad y' = \frac{p_{21}x + p_{22}y + p_{23}}{p_{31}x + p_{32}y + 1}$$

(Here (x', y') is substituted with $(x_c, y_c)$ and (x, y) is substituted with $(x'_c, y'_c)$).

To render the tablet writing to an upright form though, the skew estimated in camera coordinates is rendered back in tablet coordinates. For this, the geometric relation between the camera and the tablet is determined. Since the camera is placed perpendicular to the tablet in the center, there is rotation and translation between the coordinates. In fact, the tablet and the camera represent two extreme views of the same form object, with tablet approximating frontal view, while the camera images is a top view of the form. Also, the difference in camera and tablet pixel resolution leads to a scale change as well. Further, due to the foreshortening effect of the fish-eye lens used, there is perspective distortion present. Hence the relationship between the camera and the tablet can again be modeled by a projective transform $P_{TC}$ from tablet-to-camera and another projective transform $P_{CT}$ from camera-to-tablet. That is, a given tablet coordinate $(x'_t, y'_t)$ is related to a corresponding camera coordinate $(x'_c, y'_c)$ again using:

$$x' = \frac{p_{11}x + p_{12}y + p_{13}}{p_{31}x + p_{32}y + 1} \quad y' = \frac{p_{21}x + p_{22}y + p_{23}}{p_{31}x + p_{32}y + 1}$$

(with (x', y') substituted with $(x'_c, y'_c)$ and (x, y) substituted with $(x'_t, y'_t)$) Both $P_{TC}$ and $P_{CT}$ are independent of the form, but depend on the relative positioning of the camera and the tablet. Thus, they need be computed only once per tablet during a prior calibration stage (possibly done at manufacturing time).

The upright form coordinates are then obtained by sequentially composing the Transforms $$P_{TC} \to P_{CC} \to P_{CT}$$

on coordinates $$(x'_t, y'_t) \to (x'_c, y'_c) \to (x_c, y_c) \to (x_t, y_t)$$

Once the upright tablet coordinates are recovered, the coordinates on the original form can be obtained using:

$$X_o = A_{TO} X_t + T_{TO}$$

The overall transformation can thus be modeled as a sequence of projections $$P_{TC} \to P_{CC} \to P_{CT} \to P_{TO}$$

where the last transform is actually an affine transform.

The only transform that needs to be computed live once per sample form placed on the device 100 is the projective transform $P_{C'C}$. This is already available as a result of form indexing described above. The other transforms being form independent can be computed using the calibration steps below.

Figure 7A:
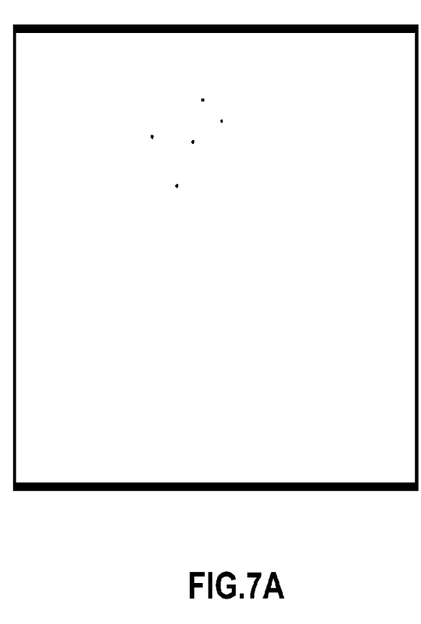
FIG. 7(a) illustrates a printed calibration page.
Figure 7B:
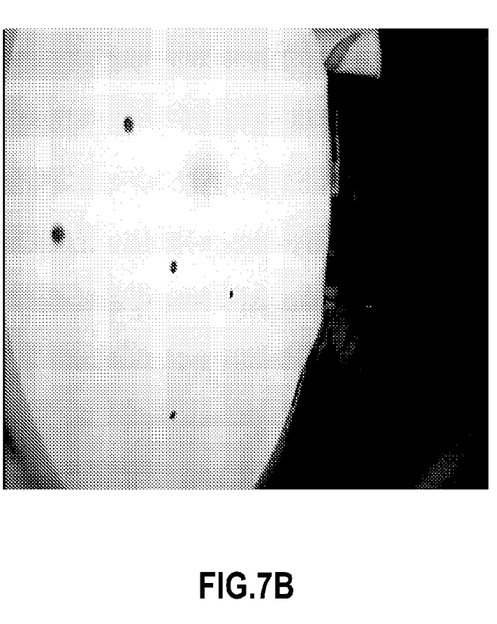
FIG. 7(b) illustrates a clip camera image of a test page.

Since at least 4 points are needed for computing the projective transforms, an electronic form consisting only of calibration dots is formed as shown in FIG. 7a. A printed version of this form is then placed in the device 100 between the reference alignment markers. A reference image of the calibration form is taken as shown in FIG. 7b. The calibration dots are then touched by the pen and their tablet coordinates recorded.

Using four sets of corresponding points thus obtained, the projective transforms $P_{TC}$, $P_{CT}$ and the affine transform $P_{TO}$ are computed using a system of linear equations given in [19].

Thus, by analyzing the geometry of the device 100 and using a prior calibration procedure, various transforms needed to project the tablet writing onto the original form are recovered even when the current sample form is skewed in appearance. By computing the live pose using an indexing approach, it is possible to create an order entry either while the form is being written or shortly afterwards.

It is not required for the handwriting on the tablet to be visible to the camera since the camera-to-tablet transform is pre-defined and can be applied as long as the reference model creation process was consistent using the alignment markers.

The embodiments of the invention describe an ease-of-use physician order entry device based on camera-assisted writing tablets. The design is easy to use and provides good transformation of tablet text into corresponding field labels in the electronic form. This allows a rapid paper form to electronic conversion without explicit need of scanning filled forms or manual population of the electronic medical records.

Thus, embodiments herein provide an apparatus, method, etc. for a camera-equipped writing tablet for digitizing form entries. More specifically, a data capture apparatus (i.e., the device 100) comprises a form holder (i.e., the clipboard 110) and an image capture device (i.e., the camera 120) connected to the form holder. The image capture device is positioned to capture an image of a form on the form holder, wherein the form could be a paper form. As described above, the image capture device has a fish-eye lens 122 (64×86 degrees) and can place 480 pixels across the width of the form and 640 pixels down the length of the form.

Further, a clip (i.e., the clip 114) is connected to the form holder, wherein the image capture device is mounted to the clip. As described above, to sense that a new form has been inserted into the data capture apparatus, a force sensing resistor (FSR) is attached to the clip, wherein an image of the form is captured each time pressure is released from the clip. Blank images, indicating that a form has been removed are ignored.

The apparatus further comprises a pen (i.e., the wireless inking pen 130) associated with the form holder, wherein the form holder comprises a pen capture device (i.e., the pen digitizing tablet 112) to electronically capture marks made on the form using the pen.

It is recognized that the pen could be connected to, clipped on to, attached to (temporarily or permanently), tethered to, linked with, joined with, affixed to, coupled to, or otherwise for use with the form holder. As described above, the pen capture device provides high spatial (1000 points per inch) and temporal (200 Hz report rate) resolution for online capture of pen input (handwriting). The pen is a combination ink and electronic pen that is associated with the form holder. It is recognized that the pen could be solely an ink pen or solely an electronic pen. As described above, the pen allows a physician to enter notes directly on the form, while the pen capture device captures pen coordinates and pen tip pressure.

A processor (i.e., the central processor 140) is also provided to query a form database using the image of the form to identify the form. As described above, form indexing is modeled as the problem of shape-based content retrieval using the perspectively distorted form appearances seen from the tablet camera. Additionally, the processor correlates the marks made on the form with respective data fields on the form and stores the marks in the respective data fields. As described above, a sequence of projective transformations are derived between the tablet, the camera and the original electronic form to allow field identification through a registration of tablet handwriting with the corresponding field labels on the form. Moreover, the processor matches affine-invariant features of the form with affine-invariant features of model forms in the form database, wherein the affine-invariant features include point features, line features, and/or intersection of lines features. As also described above, fast form indexing is provided that is an adaptation of geometric hashing based on a careful selection of basis space and affine-invariant features derived from lines and points. In addition, the apparatus further comprises at least one audio recorder and/or at least one additional image capture device to record and send data to a third party. The additional image capture device can include a video recorder and/or a display.

In addition, a method is provided wherein an image of a printed form is obtained using at least one camera attached to a form holder. As described above, ease of use considerations relieve physicians from the burden of remembering to scan artifacts such as bar codes prior to making form entries. Image capture is automatically initiated when a user start command is received, wherein an image of only a portion of the printed form may be obtained. As described above, an image of the form is captured each time pressure is released from the clip. Several images can be collected after the clip is released; in case a hand is obscuring part of the form image.

Next, the method identifies the printed form, wherein the image of the printed form is utilized to query a form database. As described above, form identification is modeled as the problem of shape content-based retrieval from a form database using the perspectively distorted form appearance images as queries. Fast form indexing is provided that is an adaptation of geometric hashing. This involves model creation, wherein images of original forms are obtained and shape-based features within the images are identified. The shape-based features are subsequently stored in the form database to create model forms. As described above, points (corners) and lines are extracted from the model form image. Moreover, a set of basis triples are selected using the point features; and point and line affine coordinates are then computed with respect to the chosen basis triples.

Furthermore, the querying of the form database includes matching affine-invariant features of the printed form with affine-invariant features of the model forms in the form database. The affine-invariant features include point features, line features, and/or intersection of lines features. As described above, lines are fairly distinctive on forms, and capture the shape layout better. However, lines are susceptible to occlusions due to changes in imaging conditions including noise. Thus, affine-invariant features derived from lines are provided that are robust under occlusions. Specifically, intersection points of lines are also used with the affine basis.

Following this, the method obtains handwritten input on the printed form using the form holder, wherein the form holder has an electronic pen capture graphic user interface.

As described above, as the user begins to write on the form, the pen pressure is sensed through the tablet and a 4-dimensional signal (x, y, p, t) is created where x and y are the tablet coordinates, p is the pen pressure, and t is the time at which the pen position was recorded by the tablet. The handwritten input is subsequently correlated with respective data fields on the printed form and stored in the respective data fields. As described above, the tablet writing is aligned with relevant sections of the original form. This involves de-skewing the tablet writing and projecting the words at appropriate locations on the original form to approximate their actual visual appearance as seen by the user. The method further includes recording data via audio recorder(s) and/or additional image capture device(s) and sending the data to a third party. The additional image capture device(s) can include a video recorder and/or a display.

Figure 8:
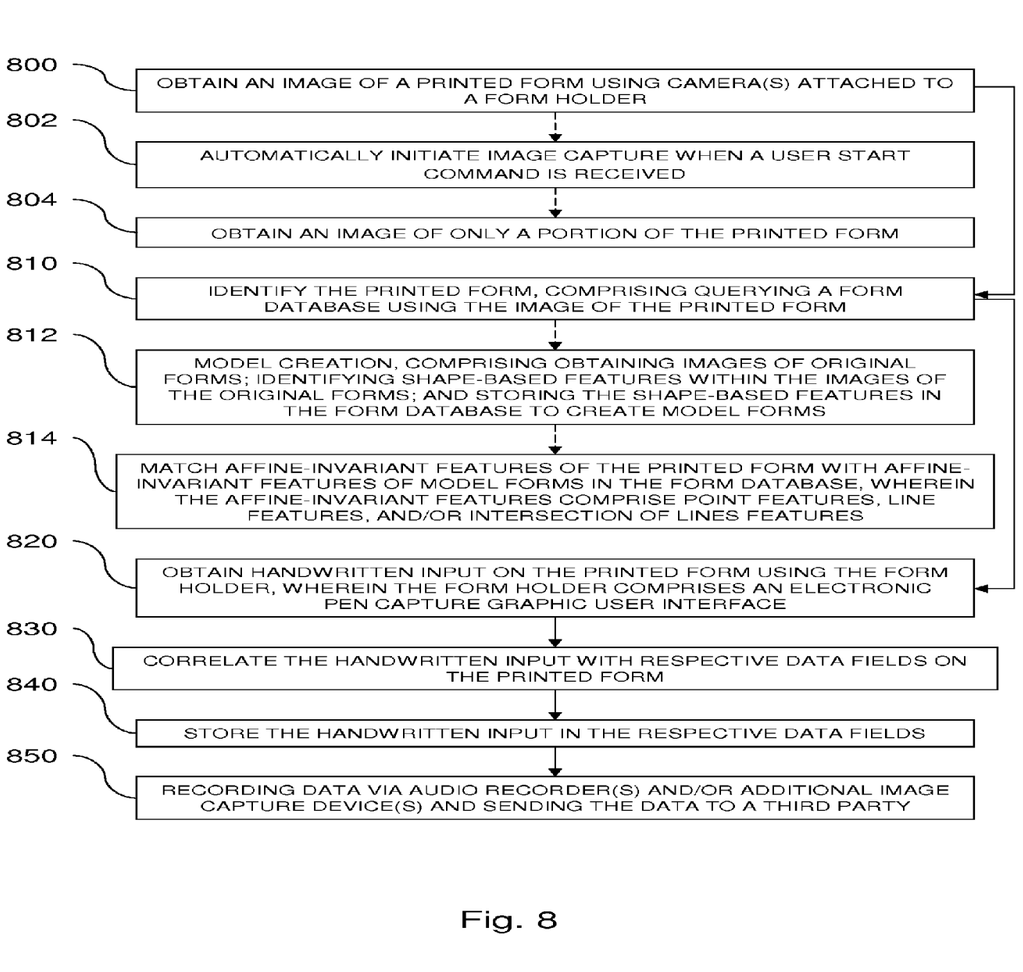
FIG. 8 is a flow diagram illustrating a method for a camera-equipped writing tablet for digitizing form entries.

FIG. 8 illustrates a flow diagram for a camera-equipped writing tablet for digitizing form entries. The method begins in item 800, by obtaining an image of a printed form using at least one camera attached to a form holder. As described above, ease of use considerations relieve physicians from the burden of remembering to scan artifacts such as bar codes prior to making form entries. Image capture is automatically initiated when a user start command is received (item 802), wherein an image of only a portion of the printed form may be obtained (item 804). As described above, an image of the form is captured each time pressure is released from the clip. Several images can be collected after the clip is released; in case a hand is obscuring part of the form image.

Next, in item 810, the printed form is identified, wherein a form database is queried using the image of the printed form. As described above, form identification is modeled as the problem of shape content-based retrieval from a form database using the perspectively distorted form appearance images as queries. Fast form indexing is provided that is an adaptation of geometric hashing. The identification of the printed form includes model creation (item 812), wherein images of original forms are obtained. Moreover, shape-based features within the images of the original forms are identified and stored in the form database to create model forms. As described above, points (corners) and lines are extracted from the model form image; and a set of basis triples are selected using the point features. Point and line affine coordinates are then computed with respect to the chosen basis triples. The basis triples that give rise to the coordinates are consolidated in the hash tables.

Additionally, the querying of the form database includes matching affine-invariant features of the printed form with affine-invariant features of the model forms in the form database, wherein the affine-invariant features include point features, line features, and/or intersection of lines features (item 814). As described above, lines are susceptible to occlusions due to changes in imaging conditions including noise. Thus, intersection points of lines are also used with the affine basis.

Following this, in item 820, handwritten input is obtained on the printed form using the form holder, wherein the form holder comprises an electronic pen capture graphic user interface. As described above, as the user begins to write on the form, the pen pressure is sensed through the tablet and a 4-dimensional signal (x, y, p, t) is created where x and y are the tablet coordinates, p is the pen pressure, and t is the time at which the pen position was recorded by the tablet. Subsequently, the handwritten input is correlated with respective data fields on the printed form (item 830) and stored in the respective data fields (item 840). As described above, the tablet writing is aligned with relevant sections of the original form, wherein the tablet writing is de-skewed and the words are projected at appropriate locations on the original form. This approximates their actual visual appearance as seen by the user. Additionally, in item 850, the method further includes recording data via audio recorder(s) and/or additional image capture device(s) and sending the data to a third party.

Figure 9:
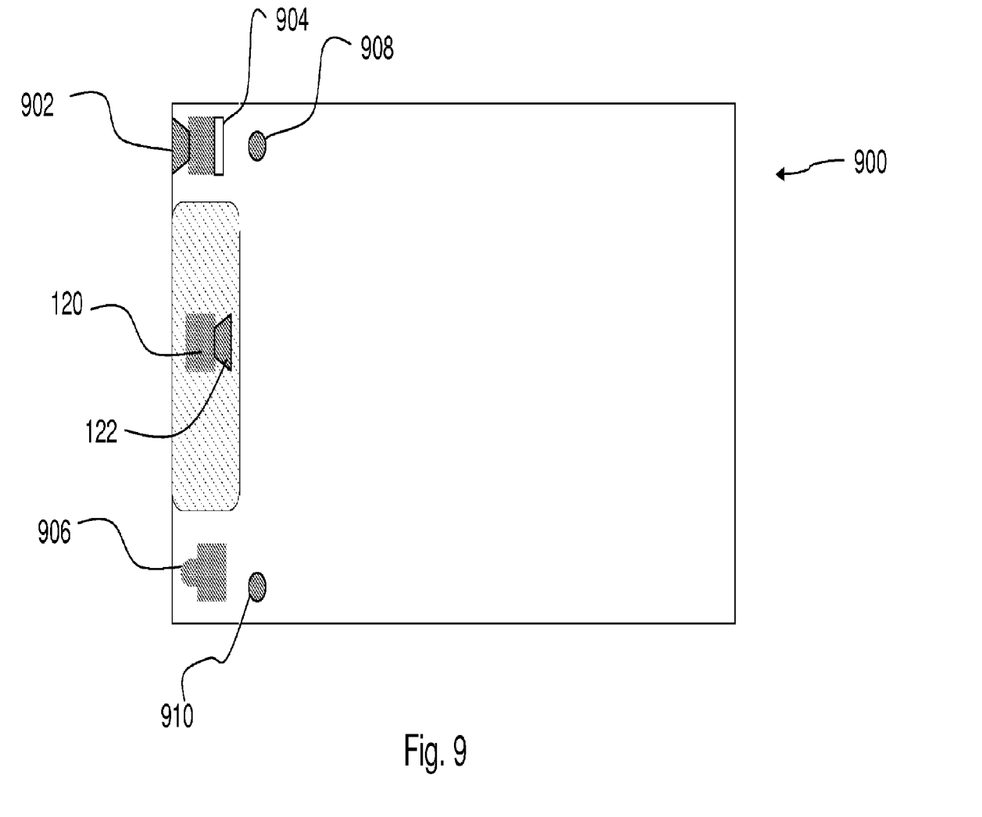
FIG. 9 illustrates a camera-equipped writing tablet for digitizing form entries with a digital camera and audio recorder.

FIG. 9 illustrates a camera-equipped writing tablet 900 for digitizing form entries with a digital camera that includes a digital camera 902 with LCD display 904 that can capture images and record video and audio, and an audio recorder 906 that can record sound. The digital camera 902 is activated by a camera shutter button 908 operated by the clinician. The audio recorder 906 is activated by audio record button 910 operated by the clinician. The clinician can point the digital camera 902 at the patient towards an area of interest (e.g. a rash), take a picture by pressing the camera shutter button 908, then press audio record button 910 and dictate comments related to the photograph. Since most visits with a doctor are short, lasting less than 15 minutes, and there is a lot of information that is conveyed from the doctor to the patient that might be missed, the doctor can record the visit by pressing audio record button 910 at the beginning of the visit, and had the resulting audio recording sent electronically (e.g. by email) to the patient so the patient and their family may listen to the visit, to understand what transpired during the visit, and to review and carry out the instructions and advise of the physician.

Accordingly, embodiments herein provide a camera-augmented writing tablet that allows physicians to write orders on paper forms placed on a tablet pad. The form filling actions are recorded as online handwriting signals by the tablet. To covert such writings into electronic form entries, the device determines the identity of the form being filled. Ease of use considerations prefer that this process be automatic in order to relieve physicians from the burden of remembering to scan artifacts such as bar codes prior to making form entries. The device subsequently identifies the field labels against which entries are being written. This will enable the population of the correct field entries in the corresponding electronic medical record.

In one embodiment, the electronic pen includes ink and electronics. In another embodiment the electronic pen is an ordinary pen or pencil and electronics and the form holder includes electronics to capture pen position as taught in U.S. Pat. No. 6,281,888, titled "Pen input device using electrostatic coupling are several electronic pen capture devices". In another embodiment the electronic pen is an ordinary pen or pencil and the form holder includes a pressure sensitive pad to capture handwriting as taught in U.S. Pat. No. 4,798,919, titled "Graphics input tablet with three-dimensional data", or any other handheld writing instrument that is used to electronically capture handwriting.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A data capture apparatus, comprising:
   a form holder;
   an image capture device connected to said form holder;
   a pen associated with said form holder, and
   a processor that identifies said form using said image of said form to match affine-invariant form features with affine-invariant features of model forms in a form database, correlates said marks made on said form with respective data fields on said form, and stores said marks made on said form in said respective data fields;
   wherein said image capture device is positioned to capture an image of a form on said form holder,
   wherein said form holder comprises a pen capture device adapted to electronically capture marks made on said form using said pen, and
   wherein said affine-invariant form features comprise at least one of point features, line features, and intersection of lines features.

2. The data capture apparatus according to claim 1, wherein said pen comprises a combination ink and electronic pen.

3. The data capture apparatus according to claim 1, wherein said form comprises a paper form.

4. The data capture apparatus according to claim 1, further comprising a clip connected to said form holder, wherein said image capture device is mounted to said clip.

5. The data capture apparatus according to claim 1, further comprising:
   at least one audio recorder and at least one additional image capture device comprising at least one of a video recorder and a display,
   wherein said audio recorder and said additional image capture device are adapted to record data and send said data to a third party.

6. A data capture apparatus, comprising:
   a form holder;
   an image capture device connected to said form holder;
   a pen connected to said form holder,
   wherein said image capture device is positioned to capture an image of a form on said form holder, and
   wherein said form holder comprises a pen capture device adapted to electronically capture marks made on said form using said pen; and
   a processor adapted to query a form database using said image of said form to identify said form based on matching affine-invariant features of said form with affine-invariant features of model forms in said form database, correlate said marks made on said form with respective data fields on said form, and store said marks made on said form in said respective data fields,
   wherein said affine-invariant features comprise at least one of point features, line features, and intersection of lines features.

7. The data capture apparatus according to claim 6, wherein said pen comprises a combination ink and electronic pen.

8. The data capture apparatus according to claim 6, wherein said form comprises a paper form.

9. The data capture apparatus according to claim 6, further comprising a clip connected to said form holder, wherein said image capture device is mounted to said clip.

10. The data capture apparatus according to claim 6, further comprising:

at least one audio recorder and at least one additional image capture device comprising at least one of a video recorder and a display, wherein said audio recorder and said additional image capture device are adapted to record data and send said data to a third party.

11. A data capture apparatus, comprising:

a form holder;

an image capture device connected to said form holder;

a pen connected to said form holder, wherein said image capture device is positioned to capture an image of a form on said form holder, and wherein said form holder comprises a pen capture device adapted to electronically capture marks made on said form using said pen; and a processor adapted to query a form database using said image of said form to identify said form, correlate said marks made on said form with respective data fields on said form, store said marks made on said form in said respective data fields, and match affine-invariant features of said form with affine-invariant features of model forms in said form database, wherein said affine-invariant features comprise at least one of point features, line features, and intersection of lines features.

12. The data capture apparatus according to claim 11, wherein said pen comprises a combination ink and electronic pen.

13. The data capture apparatus according to claim 11, wherein said form comprises a paper form.

14. The data capture apparatus according to claim 11, further comprising a clip connected to said form holder, wherein said image capture device is mounted to said clip.

15. A computer-implemented method, comprising:

obtaining an image of a printed form using at least one camera attached to a form holder;

identifying said printed form using a computer, comprising querying a form database using said image of said printed form by matching affine-invariant features of said form with affine-invariant features of model forms in said form database;

obtaining handwritten input on said printed form using said form holder, wherein said form holder comprises a pen capture graphic user interface;

correlating said handwritten input with respective data fields on said printed form using said computer; and storing said handwritten input in said respective data fields.

16. The method according to claim 15, wherein said obtaining of said image comprises automatically initiating image capture when a user start command is received.

17. The method according to claim 15, wherein said obtaining of said image of said printed form comprises obtaining an image of only a portion of said printed form.

18. The method according to claim 15, wherein said identifying of said printed form comprises model creation, comprising:

obtaining images of original forms;

identifying shape-based features within said images of said original forms; and storing said shape-based features in said form database to create model forms.

19. The method according to claim 15, wherein said matching of said affine-invariant features comprises matching at least one of point features, line features, and intersection of lines features.

20. The method according to claim 15, further comprising:

recording data via at least one of at least one audio recorder and at least one additional image capture device comprising at least one of a video recorder and a display; and sending said data to a third party.

* * * * *